(12) United States Patent
Picard

(10) Patent No.: US 8,627,296 B1
(45) Date of Patent: Jan. 7, 2014

(54) UNIFIED UNIT AND INTEGRATION TEST WITH AUTOMATIC MOCK CREATION

(75) Inventor: Antoine Picard, Mountain View, CA (US)

(73) Assignee: Google Inc., Mountain View, CA (US)

( * ) Notice: Subject to any disclaimer, the term of this patent is extended or adjusted under 35 U.S.C. 154(b) by 243 days.

(21) Appl. No.: 12/882,491

(22) Filed: Sep. 15, 2010

(51) Int. Cl.
*G06F 9/44* (2006.01)
(52) U.S. Cl.
USPC .......................... 717/135; 717/124; 717/130
(58) Field of Classification Search
None
See application file for complete search history.

(56) References Cited

U.S. PATENT DOCUMENTS

| | | | |
|---|---|---|---|
| 7,587,636 B2 * | 9/2009 | Tillmann et al. | 714/33 |
| 8,087,007 B2 * | 12/2011 | Duneau | 717/135 |
| 2008/0256517 A1 * | 10/2008 | Atkin et al. | 717/124 |

OTHER PUBLICATIONS

Mark Seemann, "Mock Objects to the Rescue! Test your .NET Code with NMock", Oct. 2004; MSDN Oct 2004 [Retrieve from msdn.microsoft.com/en-us/magazine/cc163904.aspx on Aug. 20, 2012].*

Alexander Chaffee, "Unit testing with mock objects", Nov. 1, 2002; DeveloperWorks [Retrieve from www.ibm.com/developerworks/library/j-mocktest/index.html on Aug. 20, 2012].*

Donsw, "Unit Testing options in Visual Studio 2008", May 10, 2009 [Retrieve from www.codeproject.com/Articles/36321/unit-testing-options-in-visual-studio-2008 on Aug. 26, 2012].*

Omar Al Zabir, "Do Unit Test and Integration Test from same test code using Conditional Compilation", Feb. 28, 2010 [Retrieve from http://omaralzabir.com/do_unit_test_and_integration_test_from_same_test_code_using_conditional_compilation/ on Sep. 6, 2012.*

Kirby, D., "The Python Mock Module," Sourceforge.net, 2005, 6 pages [online] [retrieved on Feb. 1, 2011] retrieved from the internet <URL:http://python-mock.sourceforge.net/>.

Bernhardt, G., "Dingus" Github Inc., 2011, 5 pages [online] [retrieved on Feb. 1, 2011] retrieved from the internet <URL:https://github.com/garybernhardt/dingus>.

* cited by examiner

*Primary Examiner* — Li B Zhen
*Assistant Examiner* — Sen Chen
(74) *Attorney, Agent, or Firm* — Fenwick & West LLP (57) ABSTRACT

Computer code for a mock object is automatically generated and used in testing computer program code. Interactions with a method of an object that is described by the computer program code are captured. From the captured interactions, mock code that creates a mock object is automatically generated. The mock object mimics the captured interactions. Subsequently, test code, which has at least some of the computer program code and mock code, is executed to enable testing of the computer program code.

14 Claims, 7 Drawing Sheets

UNIFIED UNIT AND INTEGRATION TEST WITH AUTOMATIC MOCK CREATION

BACKGROUND

1. Field of Disclosure

This disclosure relates in general to the field of software testing, and in particular to unit and integration testing of source code.

2. Description of the Related Art

In computer programming, unit testing is a software verification and validation method in which a programmer tests individual units of source code for errors. The goal of unit testing is to isolate each part of a software program and show that the individual parts are functionally correct. A difficulty with unit testing arises when individual units of code are dependent on other units of code and parts of the system that are not within the control of the developer. For example, a unit of code may contain a command to call an object that accesses an external database in order to retrieve a text string. This object call is a dependency that relies on the results returned from the database. Thus, if there is an error during the unit test, the programmer does not know if the error is caused by the dependency (i.e. the database access) or the unit of source code being tested.

To eliminate the effect of dependencies, software developers are encouraged to create mock objects. Mock objects are substituted in place of real dependencies, similar to how a car designer uses a crash test dummy to simulate the effect of vehicle impacts. The mock object simulates the behavior of a real dependency, and has the advantage of returning a known result and being much faster to execute than the real dependency.

Although unit testing with mock objects is preferred, the problem with mock objects is that they are tedious to create. Creating a mock object with conventional techniques is essentially a manual process. The software developer must examine each line of the source code being tested in order to identify dependencies. The developer then translates these dependencies into lines of code that define a mock object. Due to the difficulty in creating a mock object, many software developers choose to skip the mocking step and are unable to take advantage of the speed and reliability associated with mock testing.

Additionally, during the software development process, a developer may want to test a source code's dependencies on other pieces of source code. This type of test is known as an integration test. In contrast to unit testing, the goal of integration testing is to verify a piece of software code based on its interactions with other pieces of software code. Under conventional means, getting the benefits of unit testing and integration testing requires a developer to maintain two sets of test code. Alternatively, the developer can maintain one set of test code and manually edit the test code in order to switch between a unit test and integration test. These conventional methods require additional work on a developer's part, thus discouraging the developer from thoroughly testing the source code by using both a unit test and an integration test.

SUMMARY

The above and other issues are addressed by a method, a non-transitory computer-readable storage medium, and system for testing program code. Embodiments of the method comprise capturing interactions with a method of an object that is described by the computer program code. From the captured interactions, mock code that creates a mock object is automatically generated. The mock object mimics the captured interactions. Test code, which has at least some of the computer program code and mock code, is executed to enable testing of the computer program code.

Embodiments of the computer-readable storage medium store computer-executable instructions for performing the steps described above. Embodiments of the system further comprise a processor for executing the computer-executable instructions.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
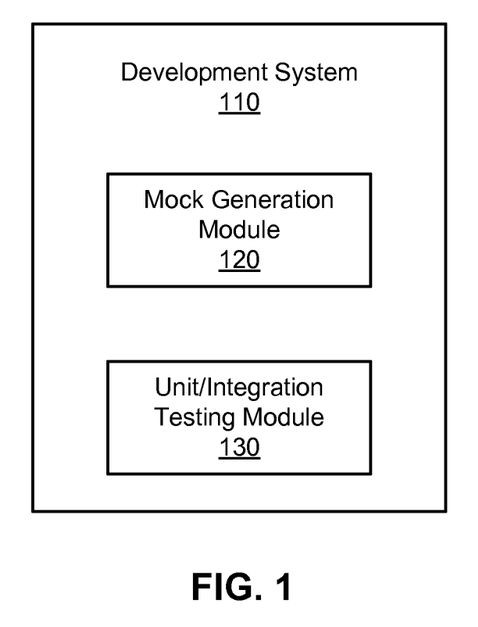
FIG. 1 is a high-level block diagram that illustrates a development system for unified unit and integration testing with automatic mock creation according to one embodiment.

FIG. 1 is a high-level block diagram that illustrates a development system 110 for unified unit and integration testing with automatic mock creation according to one embodiment. The development system 110 is an electronic device that is used to develop software code. In one embodiment, the development system 110 is a conventional computer system executing, for example, a Microsoft Windows-compatible operating system (OS), Apple OS X, and/or a Linux distribution. The development system 110 can be any type of computer system, such as a laptop, desktop, workstation, or server. The development system 110 can also be another device having computer functionality, such as a personal digital assistant (PDA), mobile telephone, video game system, etc. The development system 110 can be attached to a network in order to communicate with other electronic devices.

As shown, the development system 110 includes a mock generation module 120 and a unit/integration testing module 130. The mock generation module 120 executes a unit of source code to capture its dependencies. The unit of source code can be stored locally in the development system 110 or remotely on another computer system attached to a network. As used herein, a unit of source code is a portion of source code that can be tested in order to verify its functionality. In most programming languages, a unit of source code can make calls to one or more objects. An object is a data structure that can include various data fields and methods together with logic describing interactions of the data fields and methods. When an object is called, it responds by returning data to the caller, changing the state of data fields within the object, or both. In one embodiment, an object can either be local or global. Local objects are passed into the unit of source code as parameters at the time of execution, and cannot be called unless they are explicitly passed in. Global objects, in contrast, can be called by the unit of source code at any point, regardless of whether the global objects are explicitly passed into the code.

A unit of source code typically calls an object in order to accomplish particular tasks performed by that object (e.g. access a database, retrieve the current time, check for network errors, perform a complex calculation). In this circumstance, the object is referred to as a "dependency" of the source code because the source code is dependent upon the functionality of the called object. However, an object called by a unit of source code may be slow or return unpredictable results, thereby making it undesirable to use the actual, or "real" object in a unit test.

The mock generation module 120 generates computer code for use with a "mock" object that can be used in place of a real object during a unit test. A mock object mimics the operation of and has the same interface as its corresponding real object. However, the mock object is much simpler than a real object because it simply receives calls and returns data according to a pre-defined behavior. Unlike a real object, the mock object does not perform any time-consuming calculations or access any external data sources. The behavior of a mock object is also predictable, returning the same data each time it is called.

The unit/integration testing module 130 tests a unit of source code using either real objects or mock objects having code generated by the mock generation module 120, depending upon how the testing module is configured. This testing is advantageous because it provides a programmer with the flexibility of switching between a unit test (i.e. testing with mock objects) and an integration test (i.e. testing with real objects) without having to duplicate any test code. The unit/integration testing module 130 also verifies the results of the test to determine if any errors occurred.

Since the mock generation module 120 automatically generates the computer code used with the mock object, the burden on the programmer is decreased when performing unit testing. Since the unit/integration module 130 can quickly switch between a unit test and integration test without the duplication of test code, the burden on the programmer is further reduced. Thus, obstacles to performing unit testing are removed and programmers are more likely to perform unit tests of their work. As a result, the quality of the code produced by the programmers is increased.

Computer Architecture

Figure 2:
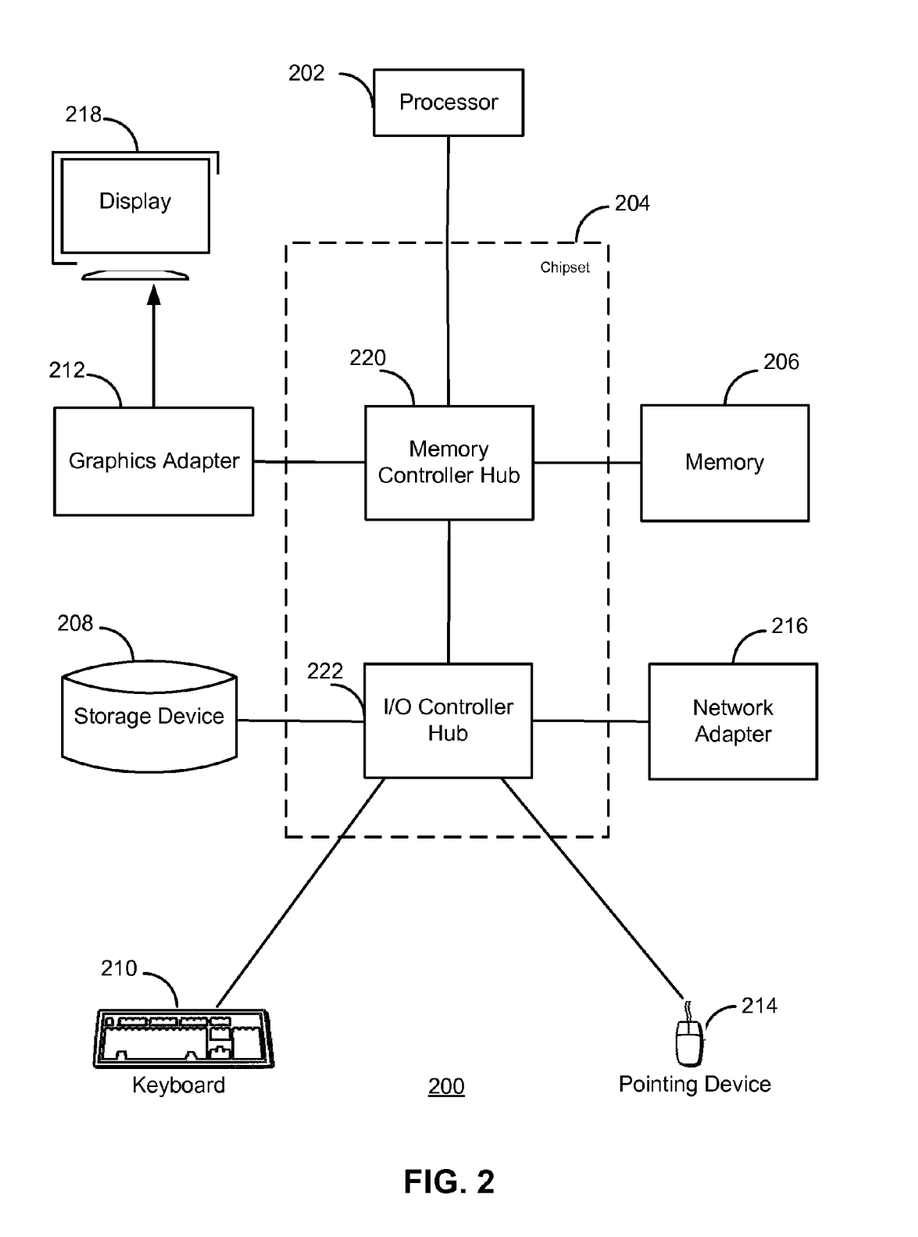
FIG. 2 is a high-level block diagram illustrating a typical computer for use as a development system.

FIG. 2 is a high-level block diagram illustrating a typical computer 200 for use as the development system 110. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer 200 to the network 116.

As is known in the art, a computer 200 can have different and/or other components than those shown in FIG. 2. In addition, the computer 200 can lack certain illustrated components. In one embodiment, a computer 200 acting as the development system 110 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Example Architectural Overview of the Mock Generation Module

Figure 3:
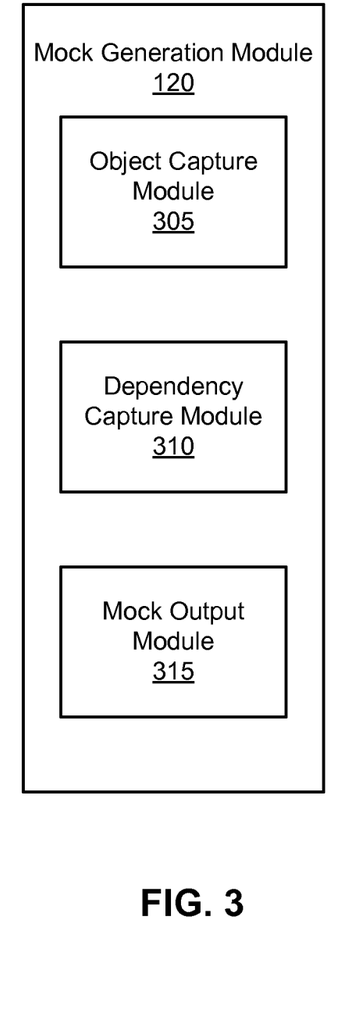
FIG. 3 is a high-level block diagram illustrating a detailed view of modules within the mock generation module according to one embodiment.

FIG. 3 is a high-level block diagram illustrating a detailed view of modules within the mock generation module 120 according to one embodiment. Some embodiments of the mock generation module 120 have different and/or other modules than the ones described herein. Similarly, the functions can be distributed among the modules in accordance with other embodiments in a different manner than is described here. Likewise, the functions can be performed by other entities.

For purposes of this discussion, assume that a programmer has developed a unit of code in a programming language that is similar to the PYTHON programming language that receives an identifier of a user and returns an integer indicating the number of characters in the user's real name. For example, the development code can be as follows:

1 Int NumCharsInRealName(user x) {
2 return len(x.GetRealName( ));
3 }

In this sample development code, line 1 declares a function "NumCharsInRealName" that accepts a parameter "x" of type "user." Line 2 indicates that the code calls the "getrealname( )" method of x, which returns the real name of user x. Further, line 2 indicates that the NumCharsInRealName function returns the result of a call of the "Len" (length) function having the real name of user x as a parameter. Thus, if user x is "apicard," and this user's real name is "Antoine Picard," the code will return the integer "13"—the number of characters in the user's name when excluding the intermediate space.

Prior to performing a unit test of this code, the programmer can include statements that invoke the functionality of the mock generation module 120 in order to generate code for use with a mock object that can be used in place of a real object during a unit test. An example of such testing code is as follows:

```
1 Test_NumCharsInRealName( ) {
2 User a=User("apicard");
3 MoxRecorder m=MoxRecorder(a);
4 Assert NumCharsInRealName(m)==13;
5 m.Report( );
6 m.Verify( );
7 }
```

In the above sample testing code, line 2 includes code for creating an object "a" of type "User" with the string "apicard." User object a is the real object that will be mocked during unit testing. Line 3 includes code for creating an object "m" of type "MoxRecorder" and assigns it the value of the MoxRecorder function run with user a as an input parameter. Line 4 includes code making an "Assert" statement that indicates whether the NumCharsInRealName function returns the integer "13" when called with MoxRecorder object m as a parameter. Line 5 includes code calling the "Report( )" method of object m, which generates the code for use with a mock object in unit testing. Line 6 includes code calling the "Verify( )" method of object m, which resets the Moxrecorder object m and includes other functionality that is utilized during unit testing.

Turning now to FIG. 3, the mock generation module 120 itself includes modules for performing various functions. These modules include an object capture module 305, a dependency capture module 310, and a mock output module 315. These modules 305, 310, 315 include functionality corresponding to the functionality invoked on the development system 110 when testing code, like that described above, is executed. The remainder of the discussion of FIG. 3 relates the illustrated modules with the sample testing code.

Line 3 of the testing code, MoxRecorder m=MoxRecorder (a), creates a MoxRecorder object m. An object of type MoxRecorder uses functionality supplied by the object capture module 305 to capture (i.e., record) underlying interactions for any methods called on the object. Said another way, the object capture module 305 includes functionality for capturing interactions performed on an object and a programmer invokes this functionality by writing code that creates and uses a MoxRecorder object.

Figure 4:
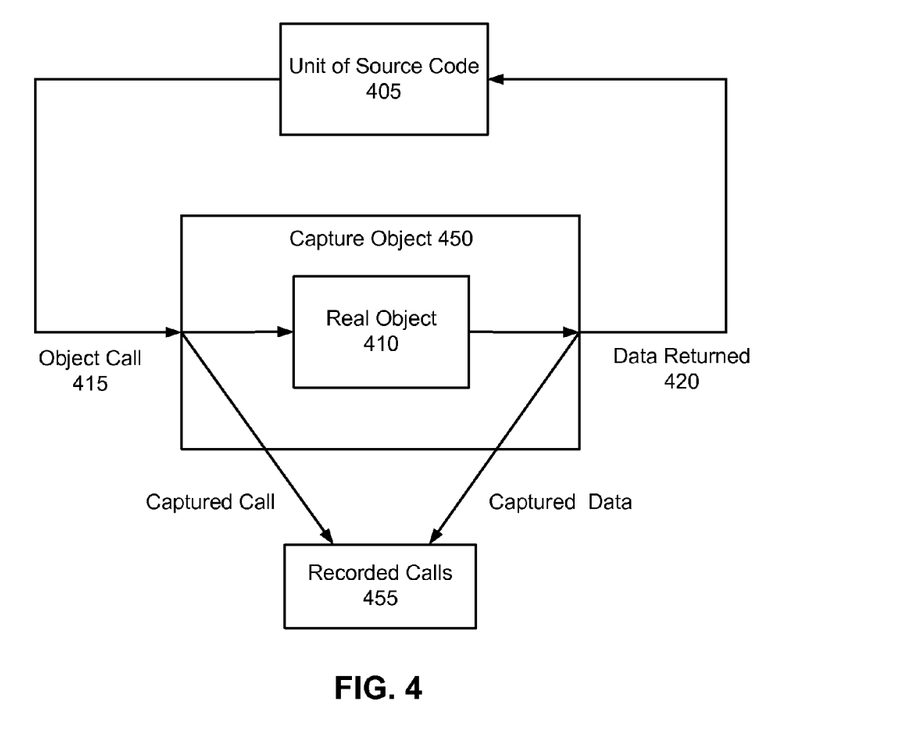
FIG. 4 is a diagram illustrating the interaction between a unit of source code and a capture object according to one embodiment.

In one embodiment, the object capture module 305 captures interactions by "wrapping" a real object (e.g., user object "a") with a capture object. The capture object simulates the operation of the wrapped real object by receiving calls from source code, passing the calls to the underlying real object, receiving data returned from the real object, and passing the data back to the caller. FIG. 4 illustrates the interaction between a unit of source code 405 and a capture object 450. The capture object 450 is created by wrapping the real object 410. The capture object 450 is configured so that whenever the capture object is called 415 by the source code 405, it passes the call to the underlying real object 410. The real object 410 executes the call and returns data to the capture object 450. The capture object 450 then forwards the returned data 420 to the calling source code 405. Each of these interactions is captured by the object capture module 305.

Moreover, the object capture module 305 records the captured interactions. In one embodiment, each call involving the capture/real objects is recorded into an ordered list of recorded calls 455 with at least the following metadata: (1) the name of the called method, (2) the parameters passed to the called method, and (3) the data returned by the called method.

For example, the sample testing code described above interacts with the MoxRecorder object m in line 4 where it uses the statement "Assert NumCharsInRealName(m)==13." This statement calls the function NumCharsInRealName( ) as described in the sample development code, and passes it the parameter MoxRecorder object m. NumCharsInRealName( ) invokes the "GetRealName" method on object m, and this interaction is captured and recorded by the object capture module 305. The object capture module 305 can record the interactions in a table like the following:

| Call | Parameter | Return Data |
|---|---|---|
| MoxRecorder x.GetRealName | user("apicard") ( ) | "Antoine Picard" |

Depending on the embodiment and the code, the object capture module 305 can capture and record interactions with one or more local and/or global objects. The technique for capturing and recording interactions with local objects is described above. For global objects, in one embodiment the programmer replaces allcalled methods of the global objects with stubs that invoke MoxRecorder to capture the interactions with the global objects and record the values returned by the methods. As a result, when development code is tested in a unit test, a mock is used for the global object method calls. In another embodiment, the programmer only replaces calls to specific methods of a global or local object with stubs that invoke Moxrecorder to capture the interactions with those methods.

A wrapped object in the development code can create one or more other objects. Interactions with these other objects should also be tracked and recorded in order to support unit testing of the code. To this end, an embodiment of the mock generation module 120 includes a dependency capture module 310 for recursively wrapping and capturing interactions with these subsequently created objects.

For example, assume that the "NumCharsInRealName" function in the sample development code described above is written as follows:

```
1 Int NumCharsInRealName(user x) {
2 RealName y=x.GetRealName( );
3 return Len(y.firstname( )) +
4 Len(y.middlename( )) +
5 Len (y.lastname( ));
6 }
```

In this second version of the NumCharsInRealName function, line 2 creates an object "y" of type "RealName" and assigns it the value returned by the "GetRealName( )" method of x. Then, lines 3-5 use the "firstname( )," "middlename( )," and "lastname( )" methods of object y to return the length of user x's real name. As a result, if the interactions with only user object x were tracked, the mock generation module 120 would miss the interactions involving the dependent RealName object y.

The dependency capture module 310 detects dependent objects and identifies the dependent objects to the capture module 305. In one embodiment, the dependency capture module 310 monitors the interactions captured by the object capture module 305 and detects when a dependent object is created. If such an object is created, the dependency capture module 310 invokes the object capture module 305 to capture interactions involving the dependent object. In this way, the dependency capture module 310 recursively identifies and tracks dependent objects.

When the sample testing code described above is executed, the object capture 305 and dependency capture 310 modules collectively capture and record the interactions with the MoxRecorder objects and any dependent objects. A mock output module 315 analyzes the recorded interactions and automatically generates lines of code that represent a mock object, called "mock code." For example, the mock output module 315 can analyze a table created by the object capture module 305 and generate the mock code based on the interactions described by the table.

In one embodiment, mock output module 315 generates the mock code by translating each call captured by the capture module 315 into computer code. The computer code uses the mock functionality inherent in the programming language, in this case a language that is similar to PYTHON, to simulate the functionality of the mocked object. For example, the calls captured in the above-mentioned table can be automatically translated into the following lines of mock code:

1 Mock_a=Mock(User("apicard"));
2 Mock_a.GetRealName( ) .andreturn("Antoine Picard");

In this code, line 1 creates a mock object called "mock_a" with the standard PYTHON library "Mock" command. Line 2 specifies that the GetRealName( ) method of the Mock_a object returns the string "Antoine Picard". In more complex scenarios, such as those involving dependent objects that are recursively tracked, the mock output module 315 will create many such lines of code to create and define the behaviors of multiple mocked objects.

The mock output module 315 outputs the generated code for display to a programmer. The mock output module 315 can also output the code for storage in the development system 110 and/or elsewhere. As described below, the mock code is used by the unit/integration testing module 130 to test the source code.

Example Architectural Overview of the Unit/Integration Testing Module

Figure 5:
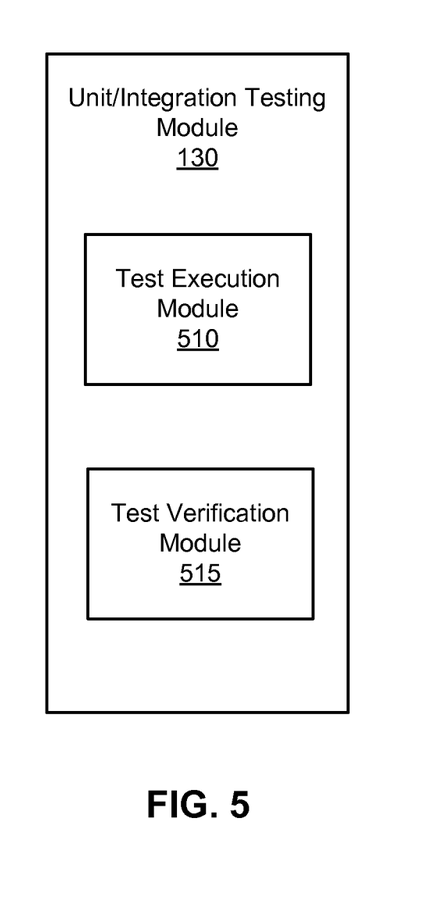
FIG. 5 is a high-level block diagram illustrating a detailed view of modules within the unit/integration testing module according to one embodiment.

FIG. 5 is a high-level block diagram illustrating a detailed view of modules within the unit/integration testing module 130 according to one embodiment. Some embodiments of the unit/integration testing module 130 have different and/or other modules than the ones described herein. Similarly, the functions can be distributed among the modules in accordance with other embodiments in a different manner than is described here. Likewise, the functions can be performed by other entities.

Assume that the programmer is using the testing code described above and that the programmer has used the mock generation module 120 to generate the mock code. The programmer inserts the mock code into the testing code by, e.g., manually cutting and pasting the mock code into the testing code, and/or using an automated technique. The resulting testing code is as follows:

1 Test_NumCharsInRealName( ) {
2 User a=User("apicard");
3 Mock_a=Mock(User("apicard"));
4 Mock_a.GetRealName( ) .andreturn("Antoine Picard");
5 MoxRecorder m=MoxRecorder (a, mock_a);
6 Assert NumCharsInRealName (m)==13;
7 m.Verify( );
8 }

In this second version of the testing code (the "combined testing code"), the mock code output by the mock output module 315 is inserted as lines 3-4. As discussed above, line 3 creates a mock object called "mock_a" and line 4 specifies that the GetRealName( ) method of the Mock_a object returns the string "Antoine Picard". In addition, the parameters passed to the MoxRecorder function at line 5 are "(a, mock.a)" instead of just "(a)" as in the previous version.

A test execution module 510 within the unit/integration testing module 130 executes a test of the development code using the combined testing code. In one embodiment, the test execution module 510 can selectively perform either a unit test (i.e. testing with mock objects) or an integration test (i.e. testing with real objects) on the development code. The programmer or another entity specifies the type of test to perform by setting a flag within the development system 110. For example, a programming environment executing on the development system 110 can include the test execution module 510 and have a configuration setting that the programmer can use to specify the type of test. Similarly, the programmer can set a variable within the testing code that the test execution module 510 examines to determine the type of test to perform. This flexibility is beneficial because it allows a programmer to get the benefits of unit testing and integration testing without maintaining two sets of test code, thereby speeding up the software development process.

In one embodiment, the test execution module 510 executes the MoxRecorder function differently depending upon the selected test type. If the programmer is performing a unit test, the output of the MoxRecorder function is generated using the mock object received as an input parameter. For example, referring to line 5 of the combined testing code, the test execution module 510 executes the MoxRecorder function using the "mock_a" input parameter, thereby causing the MoxRecorder object m to take the value of mock_a and the mock to be used when the NumCharsInRealName function is called in line 6. On the other hand, if the programmer is performing an integration test, the output of the MoxRecorder function is generated using the real object received as the input parameter. For example, referring again to line 5 of the combined testing code, the test execution module 510 executes the MoxRecorder function using the "a" input parameter, thereby causing the MoxRecorder object m to take the value of the real user object a and a's real methods to be performed when the NumCharsInRealName function is called in line 6. The functionality for selecting among the input parameters can be integrated into the MoxRecorder function.

A test verification module 515 verifies the results of the unit or integration test. In one embodiment, the test verification module 515 uses the result of the "Assert" statement to determine whether the test was successful. The statement "Assert NumCharsInRealName(m)==13" will raise an error if the "NumCharsInRealName( )" function does not return the expected value of "13." In such a case, the test verification module 515 can report the error to the programmer by, e.g., logging the error in an error report, displaying a message on a display of the development system 110, or performing a similar action.

In addition, an embodiment of the test verification module 515 determines if each method defined for each mock object was called by the testing code. This determination is made by recording interactions (i.e. calls) between development code and mock objects when the test execution module 510 executes the code. The test verification module 515 then compares the recorded interactions against the mock objects. If each method in a mock object was not called, then this indicates that the test failed because the code did not function as expected. For example, the code being tested may have changed since the mock objects were last generated. The statement "m.verify ( )" will raise an error if each method of a mock object was not called, as expected, and report the error to the programmer.

Overview of Methodology

Figure 6:
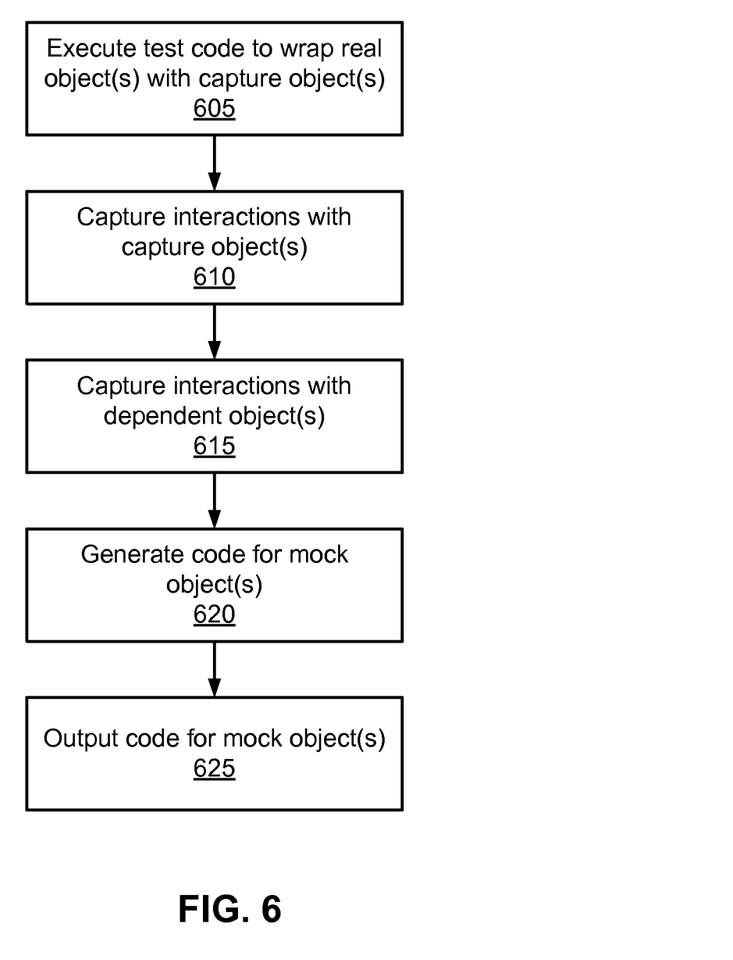
FIG. 6 is a flowchart illustrating a method of generating mock code for performing unit testing of a computer program according to one embodiment.

FIG. 6 is a flowchart illustrating a method of generating mock code for performing unit testing of a computer program according to one embodiment. In one embodiment, the method of FIG. 6 is performed by the mock generation module 120, although some or all of the method can be performed by other modules in other embodiments. In addition, other embodiments can perform the steps of the method in different orders and can include different and/or additional steps.

The mock generation module 120 executes 605 testing code that uses the MoxRecorder function wrap real objects with capture objects. As the code executes, the mock generation module 120 captures 610 interactions with the capture objects in the code. The mock generation module 120 also captures 615 interactions involving dependent objects that are created by the wrapped real objects. From the captured interactions, the mock generation module 120 automatically generates 620 lines of code for mock objects. The mock generation module then outputs 625 the code, for example, in a display that is shown to a programmer or in a file stored by the development system 110.

Figure 7:
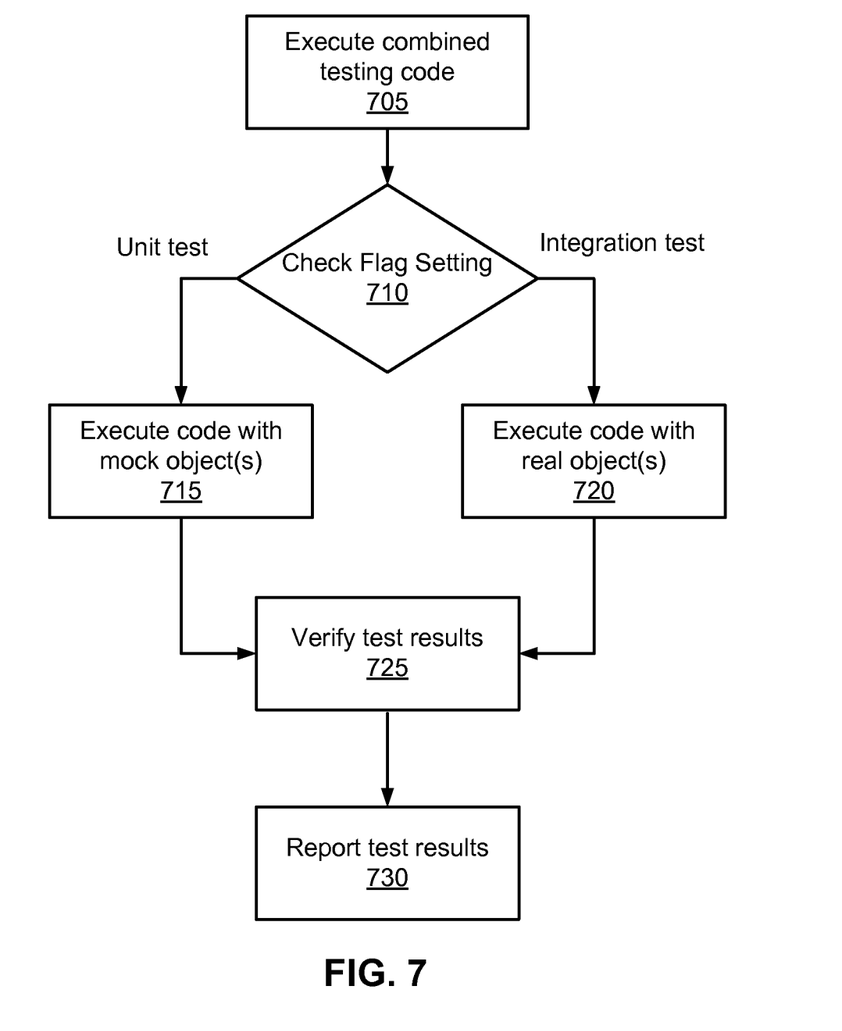
FIG. 7 is a flowchart illustrating a method of testing a computer program according to one embodiment.

FIG. 7 is a flowchart illustrating a method of testing a computer program according to one embodiment. In one embodiment, the method of FIG. 7 is performed by the unit/integration testing module 130, although some or all of the method can be performed by other modules in other embodiments. In addition, other embodiments can perform the steps of the method in different orders and can include different and/or additional steps.

The unit/integration module 130 executes 705 combined testing code. The test execution module 130 checks 710 the setting of a flag to determine the type of test to perform. If the flag is set to perform a unit test, the unit/integration module 130 executes 715 the combined testing code with mock objects. That is, the MoxRecorder functions in the code return mock objects so that the remainder of the code uses the mock objects to test the development code. If the flag is set to perform an integration test, the unit/integration module 130 executes 720 the combined testing code with real objects to test a development code's dependencies. Thus, the MoxRecorder functions in the code return real objects so that the remainder of the code uses the real objects when testing the development code and the objects' real dependencies are called. The unit/integration module 130 then verifies 725 the test results and reports 730 the verification results.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of testing a unit of computer program code that has a dependency on an object described by the computer program code, comprising:
generating a capture object based on the object described by the computer program code, a method of the capture object corresponding to a method of the object described by the computer program code;
calling the method of the capture object, the capture object interacting with the method of the object described by the computer program code responsive the method of the capture object being called;
capturing interactions with the method of the object described by the computer program code as the capture object interacts with the method of the object described by the computer program code;
responsive to the captured interactions, automatically generating mock code for creating a mock object that mimics the captured interactions; and
executing testing code having at least some the computer program code and the mock code, wherein executing the testing code comprises:
determining whether to perform a unit test or an integration test;
responsive to determining to perform the unit test, using the mock code to mimic the captured interactions during execution of the testing code; and
responsive to determining to perform the integration test, using the object described by the computer program code to perform interactions with the method of the object described by the computer program code during execution of the testing code.

2. The method of claim 1, wherein capturing interactions with the method comprises capturing one or more of:
a name of the method;
parameters passed to the method; and
data returned by the method.

3. The method of claim 1, further comprising:
detecting creation of a dependent object that is created based on data returned by the method of the capture object; and
responsive to detecting creation of a dependent object, capturing interactions with a method of the dependent object;
wherein the automatically generated mock code comprises code for creating a mock object that mimics the captured interactions with the dependent object.

4. The method of claim 1, further comprising:
identifying a plurality of parameters for a function contained within the testing code, the plurality of parameters including a real object parameter referencing a real object defined by the testing code and a mock object parameter referencing a mock object defined by the testing code; and
selecting among the plurality of parameters responsive to determining whether to perform a unit test or an integration test on the testing code;
wherein the object referenced by the selected parameter is used during execution of the testing code for the interactions.

5. The method of claim 1, wherein capturing interactions with a method of the object comprises capturing interactions with a method of one of: a local object or a global object.

6. A non-transitory computer-readable medium storing executable computer instructions for testing a unit of computer program code that has a dependency on an object described by the computer program code, the computer instructions comprising instructions for:
generating a capture object based on the object described by the computer program code, a method of the capture object corresponding to a method of the object described by the computer program code;
calling the method of the capture object, the capture object interacting with the method of the object described by the computer program code responsive the method of the capture object being called;
capturing interactions with the method of the object described by the computer program code as the capture object interacts with the method of the object described by the computer program code;

responsive to the captured interactions, automatically generating mock code for creating a mock object that mimics the captured interactions; and executing testing code having at least some the computer program code and the mock code, wherein executing the testing code comprises:

determining whether to perform a unit test or an integration test;

responsive to determining to perform the unit test, using the mock code to mimic the captured interactions during execution of the testing code; and responsive to determining to perform the integration test, using the object described by the computer program code to perform interactions with the method of the object described by the computer program code during execution of the testing code.

7. The computer-readable storage medium of claim 6, wherein capturing interactions with the method comprises capturing one or more of:

a name of the method;

parameters passed to the method; and data returned by the method.

8. The computer-readable storage medium of claim 6, wherein the instructions further comprise instructions for:

detecting creation of a dependent object that is created based on data returned by the method of the capture object; and responsive to detecting creation of a dependent object, capturing interactions with a method of the dependent object;

wherein the automatically generated mock code comprises code for creating a mock object that mimics the captured interactions with the dependent object.

9. The computer-readable storage medium of claim 6, wherein the instructions further comprise instructions for:

identifying a plurality of parameters for a function contained within the testing code, the plurality of parameters including a real object parameter referencing a real object defined by the testing code and a mock object parameter referencing a mock object defined by the testing code; and selecting among the plurality of parameters responsive to determining whether to perform a unit test or an integration test on the testing code;

wherein the object referenced by the selected parameter is used during execution of the testing code for the interactions.

10. The computer-readable storage medium of claim 6, wherein capturing interactions with a method of the object comprises capturing interactions with a method of one of: a local object or a global object.

11. A system for testing a unit of computer program code that has a dependency on an object described by the computer program code, the system comprising:

a non-transitory computer-readable storage medium storing executable computer program instructions for:

generating a capture object based on the object described by the computer program code, a method of the capture object corresponding to a method of the object described by the computer program code;

calling the method of the capture object, the capture object interacting with the method of the object described by the computer program code responsive the method of the capture object being called;

capturing interactions with the method of the object described by the computer program code as the capture object interacts with the method of the object described by the computer program code;

responsive to the captured interactions, automatically generating mock code for creating a mock object that mimics the captured interactions; and executing testing code having at least some the computer program code and the mock code, wherein executing the testing code comprises:

determining whether to perform a unit test or an integration test;

responsive to determining to perform the unit test, using the mock code to mimic the captured interactions during execution of the testing code; and responsive to determining to perform the integration test, using the object described by the computer program code to perform interactions with the method of the object described by the computer program code during execution of the testing code; and a processor for executing the computer program instructions.

12. The system of claim 11, wherein capturing interactions with the method comprises capturing one or more of:

a name of the method;

parameters passed to the method; and data returned by the method.

13. The system of claim 11, wherein the instructions further comprise instructions for:

detecting creation of a dependent object that is created based on data returned by the method of the capture object; and responsive to detecting creation of a dependent object, capturing interactions with a method of the dependent object;

wherein the automatically generated mock code comprises code for creating a mock object that mimics the captured interactions with the dependent object.

14. The system of claim 11, wherein the instructions further comprise instructions for:

identifying a plurality of parameters for a function contained within the testing code, the plurality of parameters including a real object parameter referencing a real object defined by the testing code and a mock object parameter referencing a mock object defined by the testing code; and selecting among the plurality of parameters responsive to determining whether to perform a unit test or an integration test on the testing code;

wherein the object referenced by the selected parameter is used during execution of the testing code for the interactions.

* * * * *